(12) United States Patent
Kamio

(10) Patent No.: US 11,002,360 B2
(45) Date of Patent: May 11, 2021

(54) SHIFT RANGE CONTROL APPARATUS

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 97 days.

(21) Appl. No.: 16/551,919

(22) Filed: Aug. 27, 2019

(65) Prior Publication Data

US 2019/0383387 A1 Dec. 19, 2019

Related U.S. Application Data

(63) Continuation of application No. PCT/JP2018/005826, filed on Feb. 20, 2018.

(30) Foreign Application Priority Data

Mar. 7, 2017 (JP) .............................. JP2017-042626

(51) Int. Cl.
*H02P 8/36* (2006.01)
*F16H 61/12* (2010.01)
*F16H 61/32* (2006.01)

(52) U.S. Cl.
CPC ............. *F16H 61/12* (2013.01); *F16H 61/32* (2013.01); *H02P 8/36* (2013.01); *F16H 2061/1208* (2013.01)

(58) Field of Classification Search
USPC ........................................................ 318/560
See application file for complete search history.

(56) References Cited

U.S. PATENT DOCUMENTS

| | | | |
|---|---|---|---|
| 6,230,576 B1 | 5/2001 | Yamada et al. | |
| 2004/0008002 A1 | 1/2004 | Kamio et al. | |
| 2006/0108966 A1 | 5/2006 | Kamio et al. | |
| 2011/0221382 A1* | 9/2011 | Hayashi | H02P 27/08 318/801 |
| 2019/0383387 A1* | 12/2019 | Kamio | H02P 8/36 |

FOREIGN PATENT DOCUMENTS

JP 4-312388 11/1992

* cited by examiner

*Primary Examiner* — Bentsu Ro
(74) *Attorney, Agent, or Firm* — Nixon & Vanderhye P.C.

(57) ABSTRACT

The present disclosure may provide a shift range control apparatus that controls on-off operations of switching elements in a driver circuit, drives a motor, and switches a shift range. The shift range control apparatus may be configured to determine an abnormality of a rotation angle sensor detecting a rotation angle of the motor, to control a drive of the motor using a detection value, and to execute a control which switches an energization phase every energization phase switching period without using the detection value of the rotation angle sensor in response to that the rotation angle sensor is abnormal.

7 Claims, 15 Drawing Sheets

SHIFT RANGE CONTROL APPARATUS

CROSS REFERENCE TO RELATED APPLICATION

The present application is a continuation application of international Patent Application No. PCT/JP2018/005826 filed on Feb. 20, 2018, which designated the U.S. and claims the benefit of priority from Japanese Patent Application No. 2017-042626 filed on Mar. 7, 2017. The entire disclosures of all of the above applications are incorporated herein by reference.

TECHNICAL FIELD

The present disclosure relates to a shift range control apparatus.

BACKGROUND

A shift range switching device controls a motor in response to a shift range switching request from a driver to switch a shift range.

SUMMARY

The present disclosure may provide a shift range control apparatus that controls on-off operations of switching elements in a driver circuit, drives a motor, and switches a shift range. The shift range control apparatus may be configured to determine an abnormality of a rotation angle sensor detecting a rotation angle of the motor, to control a drive of the motor using a detection value, and to execute a control which switches an energization phase every energization phase switching period without using the detection value of the rotation angle sensor in response to that the rotation angle sensor is abnormal.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

A shift range switching device controls a motor in response to a shift range switching request from a driver to switch a shift range. A switched reluctance motor is used as the drive source of a shift range switching mechanism, for example. Hereinafter, a switched reluctance motor is referred to as "SR motor".

When an encoder count value becomes abnormal, control is switched from F/B (feedback) control to open loop control. In the open loop control, if a motor vibrates greatly, it may be difficult to appropriately control drive of the motor.

The present disclosure may provide a shift range control apparatus that can appropriately switch a shift range when a rotation angle sensor is abnormal.

According to one aspect of the present disclosure, a shift range control apparatus controls on-off operations of switching elements in a driver circuit, drives a motor, and switches a shift range. The shift range control apparatus may include an abnormality determination section, a normal-time controller, and an abnormal-time controller. The abnormality determination section may determine an abnormality of a rotation angle sensor detecting a rotation angle of the motor. The normal-time controller may control a drive of the motor using a detection value of the rotation angle sensor in response to that the rotation angle sensor is normal. The abnormal-time controller may execute abnormal-time control which switches an energization phase every energization phase switching period without using the detection value of the rotation angle sensor in response to that the rotation angle sensor is abnormal. The abnormal-time controller may set a current reduction period during which a duty is less than 100% in at least a part of an energization duration during which energization continues in one phase in a same direction.

According to this configuration, in an abnormal time of the rotation angle sensor, it may be possible to prevent vibration of the motor, and to appropriately rotate the motor to a target position according to a requested shift range without using the detection value of the rotation angle sensor.

Embodiment

Figure 1:
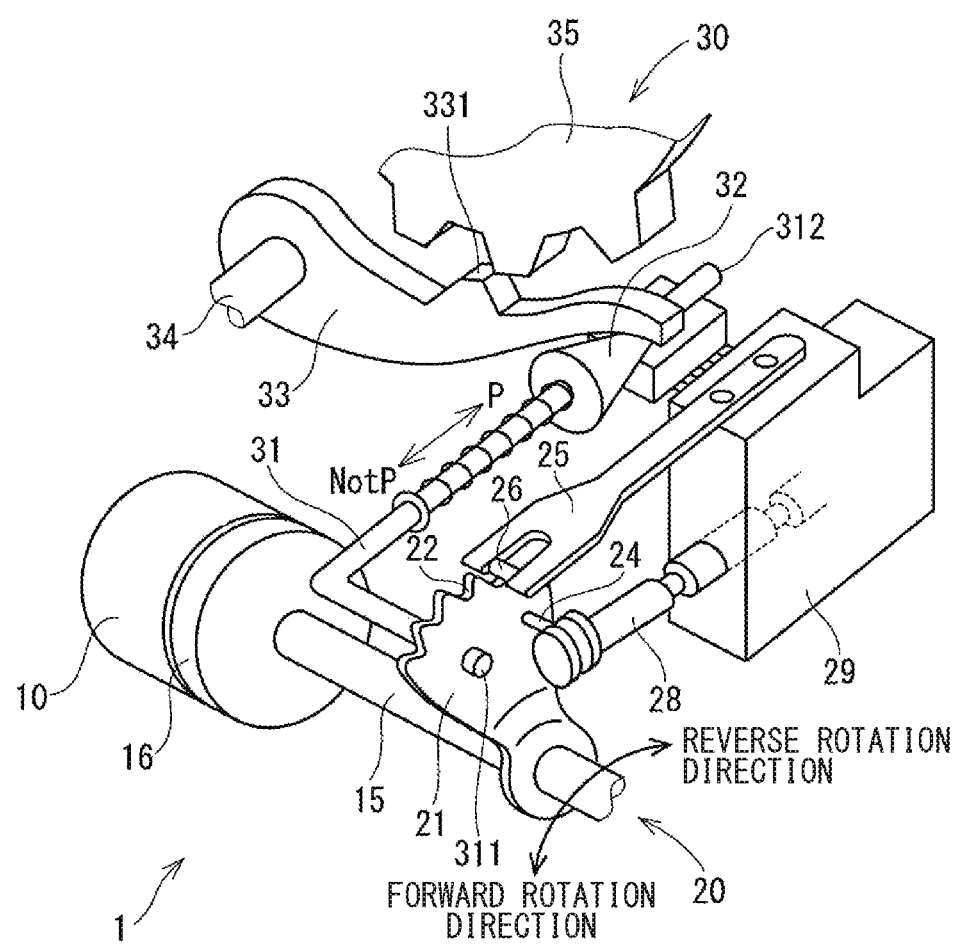
FIG. 1 is a perspective view illustrating a shift-by-wire system according to an embodiment.
Figure 2:
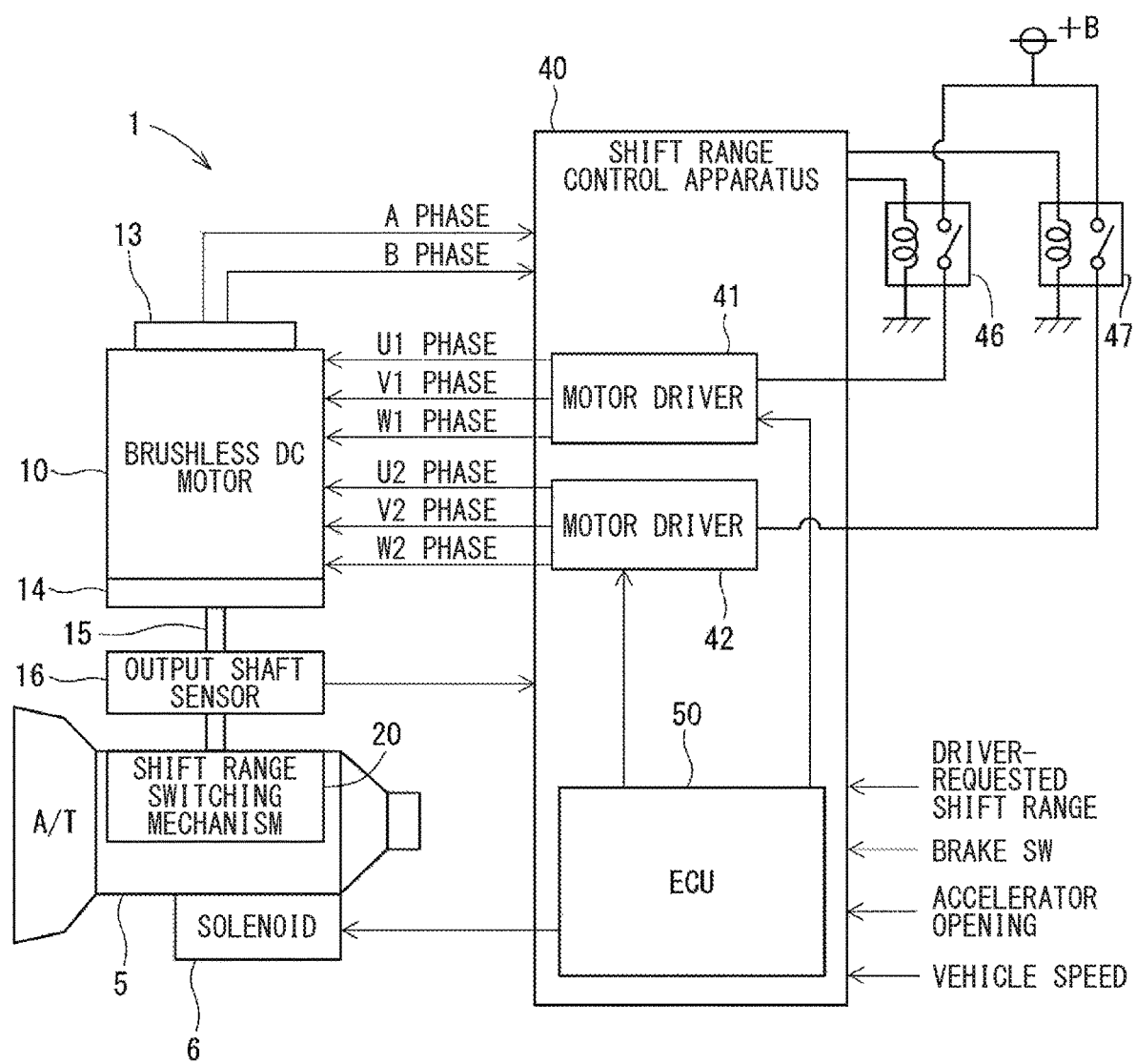
FIG. 2 is a schematic configuration diagram illustrating the shift-by-wire system according to the embodiment.
Figure 3:
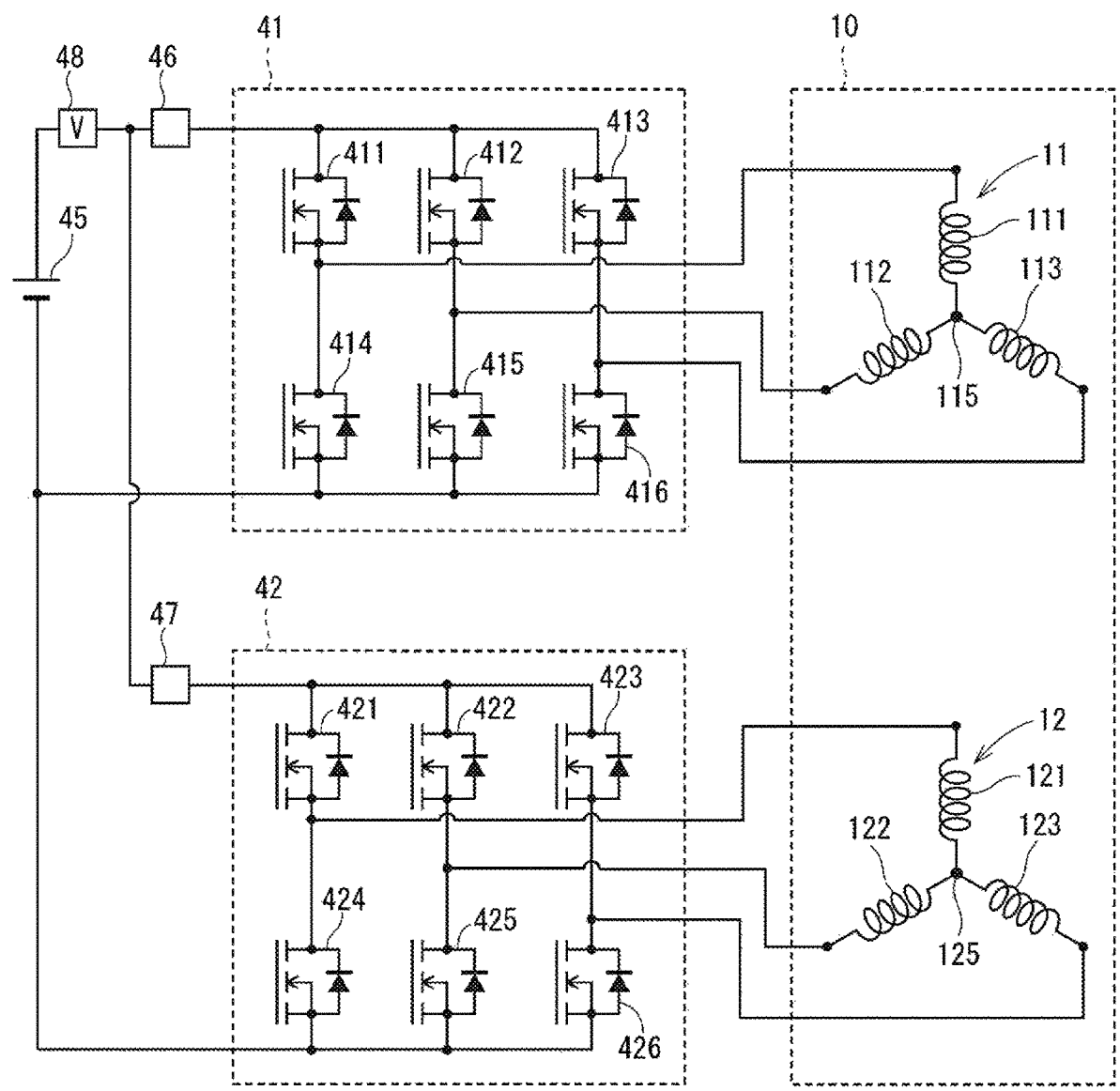
FIG. 3 is a circuit diagram illustrating a motor and a motor driver according to the embodiment.

FIGS. 1 to 17 illustrate a shift range control apparatus according to an embodiment. As illustrated in FIGS. 1 and 2, a shift-by-wire system 1, which is a shift range switching system, includes a motor 10, a shift range switching mechanism 20, a parking lock mechanism 30, a shift range control apparatus 40, and the like. The motor 10 rotates by receiving electric power supplied from a battery 45 (see FIG. 3) mounted on a vehicle (not shown), and functions as a drive source of the shift range switching mechanism 20. The motor 10 is configured to change the intensity of a current by feedback control. A motor that can change a command for each phase is used as the motor 10. The motor 10 of the present embodiment is a permanent magnet DC brushless motor. As illustrated in FIG. 3, the motor 10 has two winding sets 11 and 12. The first winding set 11 includes a U1 coil 111, a V1 coil 112, and a W1 coil 113. The second winding set 12 includes a U2 coil 121, a V2 coil 122, and a W2 coil 123.

As illustrated in FIG. 2, an encoder 13 functioning as a rotation angle sensor detects a rotational position of a rotor (not shown) in the motor 10. The encoder 13 is, for example, a magnetic rotary encoder, and is configured by a magnet that rotates integrally with the rotor, a magnetic detection Hall IC, and the like. The encoder 13 outputs A-phase and B-phase pulse signals at every predetermined angle in synchronization with the rotation of the rotor. A decelerator 14 is disposed between a motor shaft, which is the rotating shaft of the motor 10, and an output shaft 15, decelerates the rotation of the motor 10, and outputs the rotation to the output shaft 15. The rotation of the motor 10 is transmitted to the shift range switching mechanism 20. The output shaft 15 has an output shaft sensor 16 that detects the angle of the output shaft 15. The output shaft sensor 16 is, for example, a potentiometer.

As illustrated in FIG. 1, the shift range switching mechanism 20 includes a detent plate 21, a detent spring 25, and the like, and transmits rotation drive force output from the decelerator 14 to a manual valve 28 and the parking lock mechanism 30. The detent plate 21 is fixed to the output shaft 15 and driven by the motor 10. In the present embodiment, the direction in which the detent plate 21 is moved away from a base portion of the detent spring 25 is defined as a forward rotation direction and the direction in which the detent plate 21 approaches the base portion is defined as a reverse rotation direction.

The detent plate 21 has a pin 24 that projects in parallel to the output shaft 15. The pin 24 is coupled to the manual valve 28. As the detent plate 21 is driven by the motor 10, the manual valve 28 axially reciprocates. That is, the shift range switching mechanism 20 converts the rotation movement of the motor 10 into a linear movement and transmits the linear movement to the manual valve 28. The manual valve 28 is disposed in a valve body 29. As the manual valve 28 axially reciprocates, a hydraulic supply passage to a hydraulic clutch (not shown) is switched and the engagement state of the hydraulic clutch is also switched, so that a shift range is changed. Four recesses 22 are formed in the detent plate 21 on its side of the detent spring 25 for the purpose of holding the manual valve 28 at positions corresponding to the respective ranges. The recesses 22 correspond to a D range, an N range, R range, and a P range, respectively from a base portion side of the detent spring 25.

The detent spring 25 is an elastically deformable plate member and has a detent roller 26 at its distal end. The detent roller 26 is fitted into any of the recesses 22. The detent spring 25 urges the detent roller 26 to a rotation center side of the detent plate 21. When predetermined or larger rotation force is applied to the detent plate 21, the detent spring 25 elastically deforms and then the detent roller 26 moves over the recesses 22. As the detent roller 26 is fitted into any of the recesses 22, swing of the detent plate 21 is restricted, the axial position of the manual valve 28 and the state of the parking lock mechanism 30 are determined, and the shift range of an automatic transmission 5 is set.

The parking lock mechanism 30 includes a parking rod 31, a cone 32, a parking lock pole 33, a shaft 34, and a parking gear 35. The parking rod 31 is formed in a substantially L-shape and its one end 311 is fixed to the detent plate 21. The cone 32 is disposed at the other end 312 of the parking rod 31. The cone 32 is formed to decrease in diameter toward the other end 312. When the detent plate 21 swings in the reverse rotation direction, the cone 32 moves in a direction of an arrow P.

The parking lock pole 33 abuts against a conical surface of the cone 32 and is swingable about the shaft 34. The parking lock pole 33 has a projection 331 that can mesh with the parking gear 35 on its side of the parking gear 35. When the detent plate 21 rotates in the reverse rotation direction and the cone 32 moves in the direction of the arrow P, the parking lock pole 33 is pushed up and the projection 331 meshes with the parking gear 35. On the other hand, when the detent plate 21 moves in the forward rotation direction and the cone 32 moves in a direction of an arrow notP, mesh of the projection 331 with the parking gear 35 is released.

The parking gear 35 is attached to an axle (not shown) to be capable of meshing with the projection 331 of the parking lock pole 33. When the parking gear 35 meshes with the projection 331, the rotation of the axle is restricted. When the shift range is the notP range other than the P range, the parking gear 35 is not locked by the parking lock pole 33 and thus the rotation of the axle is not hindered by the parking lock mechanism 30. When the shift range is the P range, the parking gear 35 is locked by the parking lock pole 33 and the rotation of the axle is thus restricted.

As illustrated in FIGS. 2 and 3, the shift range control apparatus 40 includes motor drivers 41 and 42 functioning as driver circuits, an ECU 50, and the like. The motor driver 41 is a three-phase inverter that switches energization of the first winding set 11. In the motor driver 41, switching elements 411 to 416 are bridge-connected. One end of the U1 coil 111 is connected to a connection point of the paired U-phase switching elements 411 and 414. One end of the V1 coil 112 is connected to a connection point of the paired V-phase switching elements 412 and 415. One end of the W1 coil 113 is connected to a connection point of the paired W-phase switching elements 413 and 416. Other ends of the coils 111 to 113 are connected to each other at a connecting portion 115.

The motor driver 42 is a three-phase inverter that switches energization of the second winding set 12. In the motor driver 42, switching elements 421 to 426 are bridge-connected. One end of the U2 coil 121 is connected to a connection point of the paired U-phase switching elements 421 and 424. One end of the V2 coil 122 is connected to a connection point of the paired V-phase switching elements 422 and 425. One end of the W2 coil 123 is connected to a connection point of the paired W-phase switching elements 423 and 426. Other ends of the coils 121 to 123 are connected to each other at a connecting portion 125. While the switching elements 411 to 416 and 421 to 426 are MOSFETs in the present embodiment, these switching elements may be other elements such as IGBTs.

A motor relay 46 is disposed between the motor driver 41 and the battery 45. A motor relay 47 is disposed between the motor driver 42 and the battery 45. The motor relays 46 and 47 are turned on when a start switch such as an ignition switch is turned on, and electric power is supplied to the motor 10. In addition, the motor relays 46 and 47 are turned off when the start switch is turned off, and supply of electric power to the motor 10 is blocked. A voltage sensor 48 that detects a battery voltage Vb is disposed on a high-potential side of the battery 45. The battery voltage Vb corresponds to "input voltage" in the present embodiment. The shift range control apparatus 40 includes a current sensor (not shown) that detects a motor current Im.

The ECU 50 controls on-off operations of the switching elements 411 to 416 and 421 to 426, thus controlling drive of the motor 10. The ECU 50 also controls drive of a transmission hydraulic control solenoid 6 based on a vehicle speed, an accelerator opening, a brake switch state, a driver-requested shift range, and the like. By controlling the transmission hydraulic control solenoid 6, transmission gears are controlled. The number of the transmission hydraulic control solenoids 6 corresponds to the number of transmission gears. While the single ECU 50 controls drive of the motor 10 and the solenoid 6 in the present embodiment, a motor controlling motor ECU that controls the motor 10 and a solenoid controlling AT-ECU may be provided separately. Hereinafter, drive control of the motor 10 will be mainly described.

Figure 4:
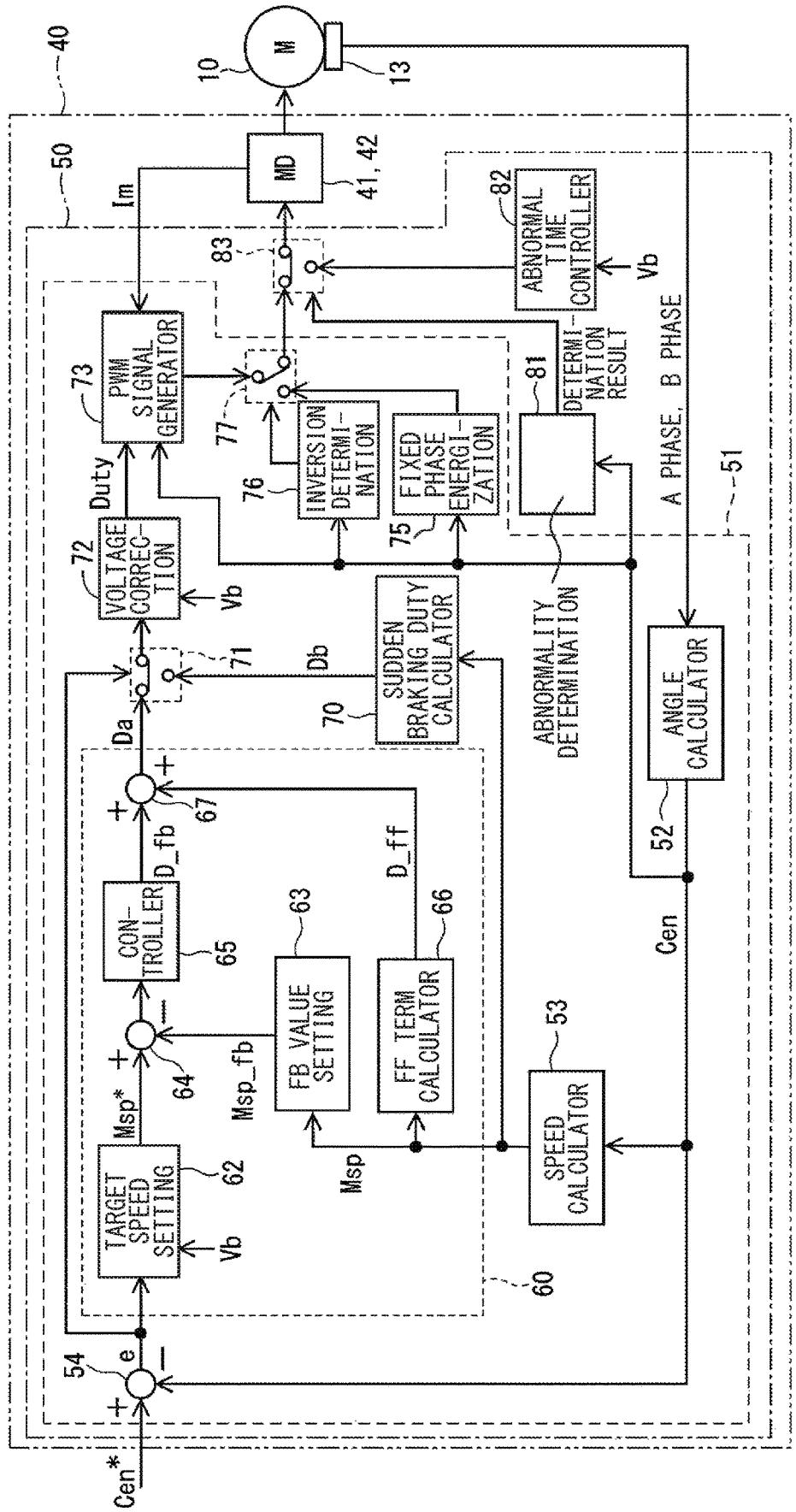
FIG. 4 is a block diagram illustrating a shift range control apparatus according to the embodiment.
Figure 5:
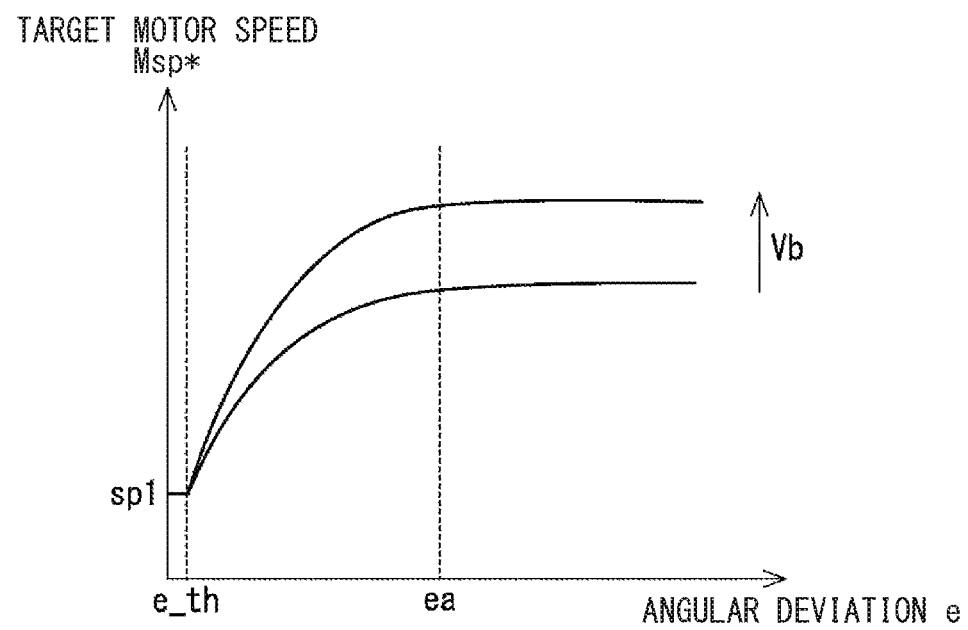
FIG. 5 is an explanatory view for explaining target speed setting according to the embodiment.

As illustrated in FIG. 4, the ECU 50 includes a normal-time controller 51, an abnormality determination section 81, an abnormal-time controller 82, a signal switching portion 83, and the like, and is configured by a microcontroller. Processes in the ECU 50 may be software processes performed by a CPU executing programs stored in a solid-state memory device such as a ROM in advance, or may be hardware processes performed by a dedicated electronic circuit.

The normal-time controller 51 includes an angle calculator 52, a speed calculator 53, an angular deviation calculator 54, a feedback controller 60, a sudden braking duty calculator 70, a duty switching portion 71, a voltage corrector 72, a PWM signal generator 73, a fixed-phase energization controller 75, an inversion determination section 76, and a normal signal output portion 77.

The angle calculator 52 calculates an actual count value Cen that is a count value of the encoder 13 based on A-phase and B-phase pulses output from the encoder 13. The actual count value Cen is a value based on actual mechanical and electrical angles of the motor 10. That is, the actual count value Cen can be converted into an actual motor angle θm. The speed calculator 53 calculates a motor speed Msp that is the rotating speed of the motor 10 based on the actual count value Cen.

The angular deviation calculator 54 calculates the difference between a target count value Cen* based on a driver-requested shift range input by an operation of a shift lever (not shown) and the actual count value Cen. Hereinafter, the absolute value of the difference between the target count value Cen* and the actual count value Cen is defined as an angular deviation e. The actual count value Cen is regarded as "actual angle". The target count value Cen* is regarded as "target angle".

The feedback controller 60 includes a target speed setting section 62, a feedback value setting section 63, a speed deviation calculator 64, a controller 65, a feedforward term calculator 66, an adder 67, and the like. Hereinafter, feedback is appropriately referred to as "FB", Feedforward is appropriately referred to as "FF".

The target speed setting section 62 calculates a target motor speed Msp* that is the target speed of the motor 10 based on the angular deviation e. Based on a map illustrated in FIG. 5, for example, the target motor speed Msp* is set to increase as the angular deviation e increases when the angular deviation e is less than or equal to a predetermined value ea. When the angular deviation e is larger than the predetermined value ea, the target motor speed Msp* is a predetermined maximum value. In addition, the target motor speed Msp* is set to a set speed sp1 (for example, 1000 rpm) when the angular deviation e is an angle determination threshold e_th. The target motor speed Msp* is set to increase as the battery voltage Vb increases.

When the control state of the motor 10 is mode 2 or mode 3 (described later), that is, steady-state control or deceleration control, the FB value setting section 63 performs phase advancing compensation that advances the phase of the motor speed Msp and sets a speed phase advancing value Msp_pl to a speed feedback value Msp_fb. When the control state of the motor 10 is mode 1, that is, acceleration control, the FB value setting section 63 does not perform the phase advancing compensation and sets the motor speed Msp to the speed feedback value Msp_fb. It is assumed that the speed phase advancing value Msp_pl is also included in the concept of "motor speed".

The speed deviation calculator 64 calculates a speed deviation ΔMsp of the target motor speed Msp* and the speed feedback value Msp_fb. The controller 65 calculates a FB duty D_fb by, for example, P control or PI control so that the speed deviation ΔMsp is 0, that is, the target motor speed Msp* is matched with the speed feedback value Msp_fb.

The FF term calculator 66 calculates a FF duty D_ff based on the control state of the motor 10. The FF duty D_ff in the acceleration control is a maximum acceleration duty calculated based on a map illustrated in FIG. 6A, and increases as the motor speed Msp increases. In the present embodiment, the FF duty D_ff is calculated so as to be a maximum duty until the motor speed Msp is higher than or equal to the target motor speed Msp*. The FF duty D_ff in the steady-state control is a speed keeping duty calculated based on a map illustrated in FIG. 6B. The speed keeping duty is a duty for keeping the motor speed Msp at no-load, and increases as the motor speed Msp increases. The FF duty D_ff in the deceleration control is a deceleration correction duty calculated based on a map illustrated in FIG. 6C. The deceleration correction duty is a correction duty for achieving the target motor speed Msp*. When the motor 10 rotates in the forward direction, the value of the deceleration correction duty is negative and decreases as the motor speed Msp increases. That is, as the motor speed Msp increases, the absolute value of the deceleration correction duty increases.

Figure 6A:
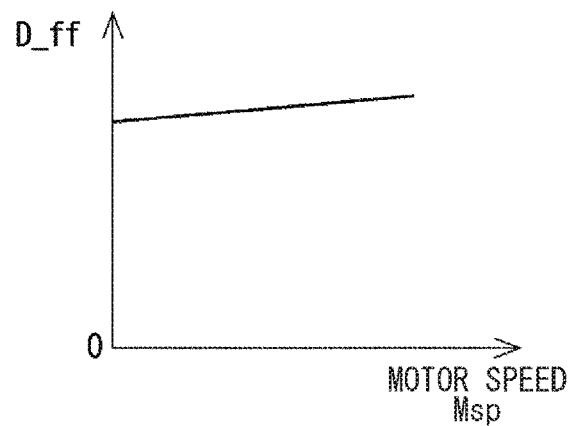
FIG. 6A is an explanatory view for explaining an FF duty in acceleration control according to the embodiment.
Figure 6B:
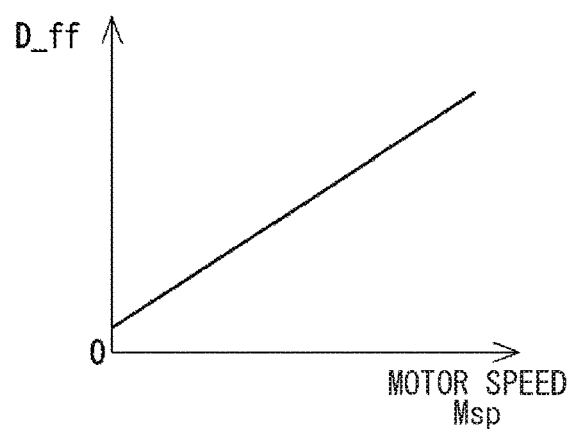
FIG. 6B is an explanatory view for explaining an FF duty in normal control according to the embodiment.
Figure 6C:
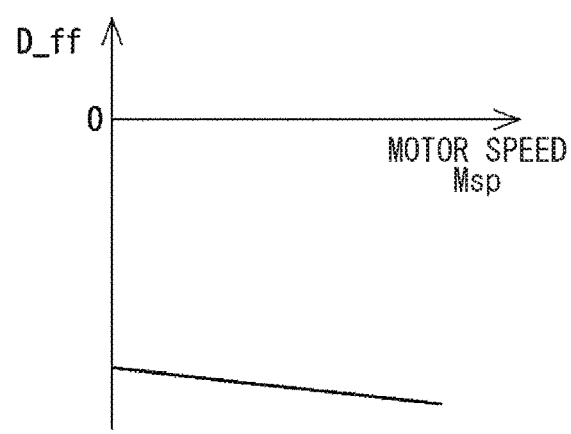
FIG. 6C is an explanatory view for explaining an FF duty in deceleration control according to the embodiment.

FIGS. 6A, 6B, and 6C illustrate a case where the motor 10 rotates in the forward rotation direction. When the motor 10 rotates in the reverse rotation direction, the sign of the FF duty D_ff is reversed. The same holds true for a fixed duty Db (described later). While a description has been given assuming that the FF duty D_ff is calculated based on the motor speed Msp in the present embodiment, the FF duty D_ff may be calculated based on the target motor speed Msp* instead of the motor speed Msp. The adder 67 adds the FB duty D_fb to the FF duty D_ff, thus calculating a corrected FB duty Da.

In the feedback control of the present embodiment, by changing a duty using PWM control or the like, the current flowing in the coils 111 to 113 and 121 to 123 and torque can be changed. In the present embodiment, the motor 10 is driven by turning on a switching element on a first-phase high-potential side and a switching element on a second-phase low-potential side, so-called by 120° energization. According to 120° energization, as the first phase and the second phase alternate every electrical angle of 60°, an energization phase is switched. A rotating magnetic field is thus generated in the winding sets 11 and 12, so that the motor 10 is rotated. In the present embodiment, the rotation direction of the motor 10 when the output shaft 15 rotates the forward rotation direction is defined as a forward direction. Further, the duty when the motor 10 outputs positive torque is defined as a positive duty, the duty when the motor 10 outputs negative torque is defined as a negative duty, and the possible duty range is from −100[%] to 100[%]. That is, when the motor 10 rotates forward, the duty is positive. On the other hand, when the motor 10 rotates in reverse, the duty is negative. When brake torque (that is, negative torque) is generated for the purpose of stopping the motor 10 rotating forward, the rotation direction of the motor 10 is the forward rotation direction but the duty is negative. Similarly, when brake torque is generated for the purpose of stopping the motor 10 rotating in reverse, the duty is positive.

Figure 7:
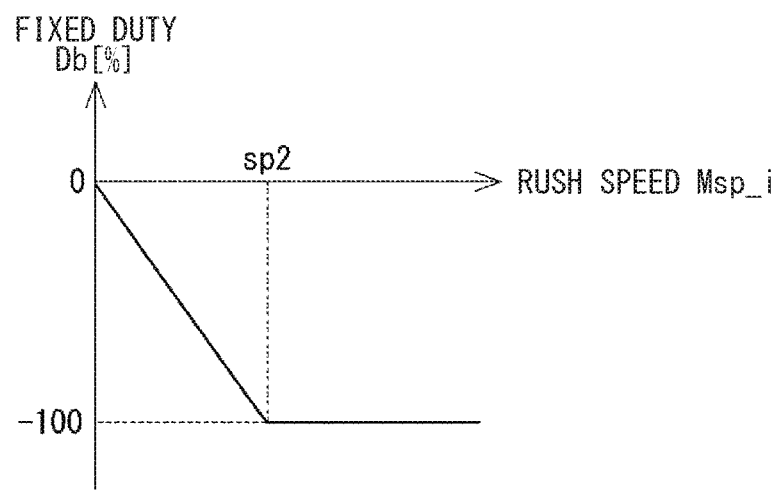
FIG. 7 is an explanatory view for explaining a fixed duty according to the embodiment.

The sudden braking duty calculator 70 calculates a fixed duty Db according to a rush speed Msp_i that is the motor speed Msp when sudden braking control starts, that is, the angular deviation e is smaller than an angle determination threshold e_th. The fixed duty Db is a duty at sudden braking. As illustrated in FIG. 7, the value of the fixed duty Db when the motor 10 rotates forward is negative. When the rush speed Msp_i is lower than a predetermined speed sp2, as the rush speed Msp_i increases, the absolute value of the fixed duty Db increases. When the rush speed is higher than or equal to the predetermined speed sp2, the fixed duty Db is −100[%].

The duty switching portion 71 switches a signal generation duty between a corrected FB duty Da and the fixed duty Db. In the present embodiment, when the angular deviation e is larger than or equal to the angle determination threshold e_th, the corrected FB duty Da is selected as the signal generation duty and output to the voltage corrector 72. When the angular deviation e is less than the angle determination threshold e_th, the fixed duty Db is selected as the signal generation duty and output to the voltage corrector 72.

The voltage corrector 72 corrects the corrected FB duty Da selected or the fixed duty Db selected at the battery voltage Vb to calculate a duty command value. The PWM signal generator 73 generates a command signal Spwm related to switching of the switching elements 411 to 416 and 421 to 426 based on the duty command value or the actual count value Cen. The PWM signal generator 73 also adjusts the command signal Spwm so that a motor current Im does not exceed a current limit value Im_max.

The fixed-phase energization controller 75 executes fixed-phase energization control. The fixed-phase energization control is control for stopping the rotation of the motor 10. In the fixed-phase energization control, a fixed phase is selected according to an electrical angle, and a command signal Sfix related to switching of the switching elements 411 to 416 and 421 to 426 is generated so that a current flows in the selected fixed-phase in a predetermined direction. An excitation phase is thus fixed. When the excitation phase is fixed, the motor 10 stops at a predetermined electrical angle according to the excitation phase. The fixed-phase energization controller 75 selects a fixed phase and an energization direction based on the actual count value Cen so that the motor 10 stops at an electrical angle that is the closest to the current rotor position.

In the present embodiment, the fixed-phase energization control continues over a fixed-phase energization duration Ta. The duty during a fixed-phase energization period for fixed-phase energization control is maximized and constant. Alternatively, the duty may be maximized during a first period until a predetermined time elapses from the start and in a second period from when the predetermined time elapses to when fixed-phase energization control ends, the duty may be gradually changed so that a motor current is 0 when the fixed-phase energization control ends. Alternatively, the duty during the second period may be a predetermined value whose absolute value is less than the maximum duty. As the motor current when the fixed-phase energization control ends is reduced, it is possible to reduce vibration of a motor shaft when energization is turned off from the fixed-phase energization control and to appropriately keep a state where the output shaft 15 stops at a desired position.

The inversion determination section 76 determines whether the rotation of the motor 10 is inverted based on the actual count value Cen. The normal signal output portion 77 switches a signal to be output to the motor drivers 41 and 42 during normal control. In the present embodiment, when the motor 10 rotates in a rotation direction according to a requested shift range, that is, before the rotation of the motor 10 is inverted, the command signal Spwm generated in the PWM signal generator 73 is selected. When the motor 10 is inverted, the command signal Sfix generated in the fixed-phase energization controller 75 is selected.

The abnormality determination section 81 monitors an abnormality of the encoder 13. When the actual count value Cen does not change over an abnormality duration Te during energization of a motor, the abnormality determination section 81 determines that an abnormality occurs in the encoder 13. Examples of the abnormality of the encoder 13 include not only an abnormality of the encoder 13 itself but also breaking of wires connected to the encoder 13. When an abnormality occurs in the encoder 13, the abnormal-time controller 82 executes, as abnormal-time control, open drive control of directly controlling an energization phase without using the actual count value Cen. In the open drive control, the switching elements 411 to 416 and 421 to 426 are on-off controlled so that the energization phase is switched every predetermined energization phase switching period Pc (for example, every 5 [ms]).

The signal switching portion 83 switches a signal to be output to the motor drivers 41 and 42 according to an abnormality determination result of the abnormality determination section 81. Specifically, when the encoder 13 is normal, a signal selected by the normal signal output portion 77 is output to the motor drivers 41 and 42. When the encoder 13 is abnormal, a signal generated by the abnormal-time controller 82 is output to the motor drivers 41 and 42.

Figure 8A:
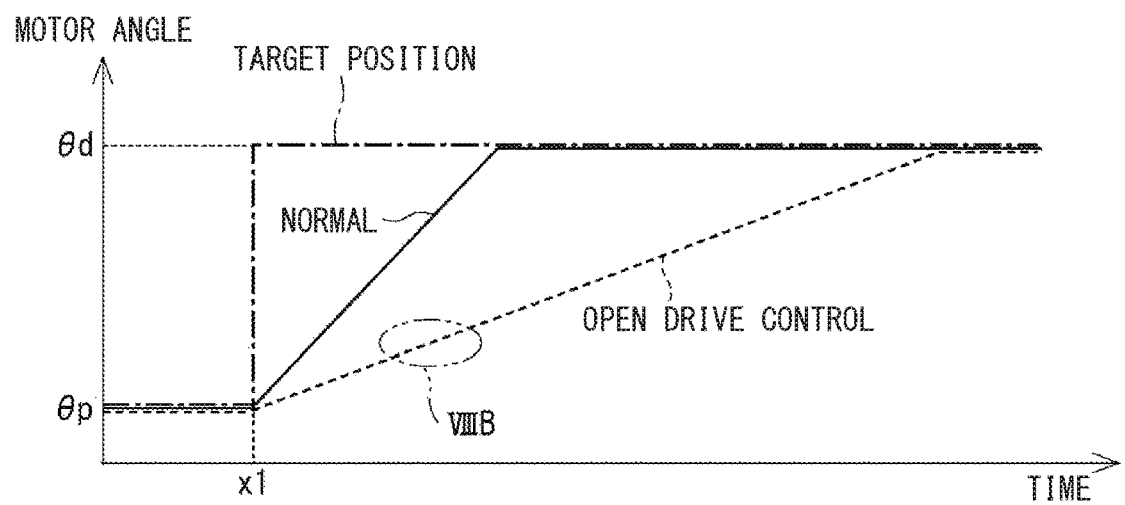
FIG. 8A is a time chart for explaining open drive control according to the embodiment.

Open drive control will be described with reference to FIGS. 8A, 8B, and 9. Hereinafter, a description will be made assuming that the motor 10 is rotated in a forward direction for the purpose of changing a shift range from a P range to a D range. As illustrated in FIG. 8A, the shift range before a time x1 is the P range and the motor angle in this case is defined as θp. When the driver-requested shift range is switched from the P range to the D range at the time x1, as indicated by an alternate long and short dash line, the target position of the motor angle θm is set to an angle θd. When the encoder 13 is normal, the motor 10 is driven by feedback control using the actual count value Cen as indicated by a solid line, so that the motor 10 is quickly rotated to the angle θd. On the other hand, when the encoder 13 is abnormal, the feedback control using the count value of the encoder 13 cannot be executed. For this reason, the motor 10 is rotated to the angle θd by open drive control without using the actual count value Cen. In the open drive control, as indicated by a broken line, it takes a longer time for the motor 10 to be rotated to the angle θd than in a normal case for the purpose of reducing vibration of the motor 10.

Figure 8B:
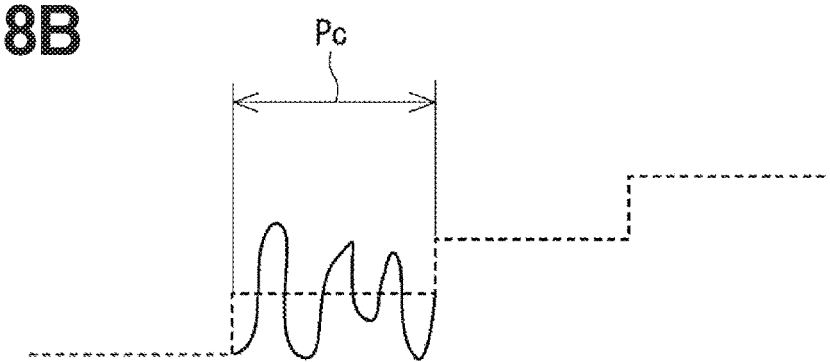
FIG. 8B is an enlarged view of a part VIIIB of FIG. 8A.

FIG. 8B is an enlarged view of a part VIIIB in FIG. 8A. In FIG. 8B, the theoretical motor angle θm obtained by switching an energization phase is indicated by a broken line, whereas the motor angle θm when open drive control is executed with a duty of 100% is indicated by a solid line. FIG. 8B illustrates the motor angle θm in open drive with a duty of 100% during a single energization phase switching period Pc. As illustrated in FIG. 8B, in the open drive control, the energization phase is switched every energization phase switching period Pc, so that the motor 10 is driven stepwise. In the present embodiment, a DC brushless motor with larger torque than an SR motor is used as the motor 10. If the duty is set to 100[%] and a switching element in the energization phase is kept turned on during an energization duration Pk (see FIG. 9), as indicated by the solid line in FIG. 8B, the motor 10 vibrates violently and thus drive of the motor 10 may not be controlled appropriately. Hereinafter, a state where the motor 10 vibrates violently and thus drive of the motor 10 cannot be controlled appropriately is referred to as "out-of-step".

Figure 9:
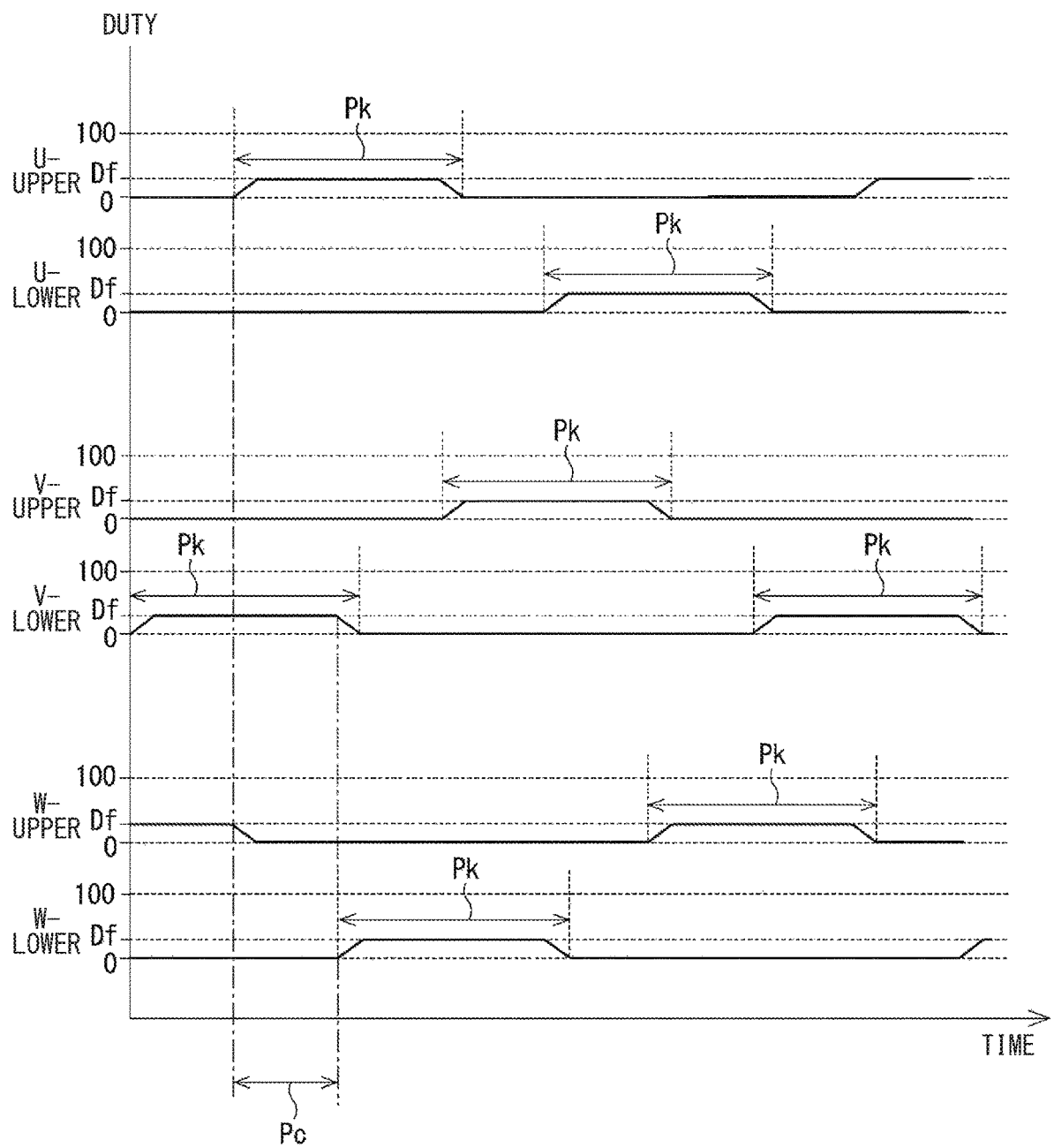
FIG. 9 is a time chart for explaining a duty in the open drive control according to the embodiment.

FIG. 9 illustrates a duty in open drive control according to the present embodiment. FIG. 9 illustrates the duties of the switching element 411 as a U-phase upper arm element, the switching element 414 as a U-phase lower arm element, the switching element 412 as a V-phase upper arm element, the switching element 415 as a V-phase lower arm element, the switching element 413 as a W-phase upper arm element, and the switching element 416 as a W-phase lower arm element in the open drive control. In FIG. 9, the U-phase upper arm element is abbreviated to "U-upper", for example. Switching patterns of the switching elements 421 to 426 in the motor driver 42 are similar to those of the motor driver 41, and thus its description will be omitted. An energization phase difference may be present between the motor drivers 41 and 42. In order to avoid complexity, only a single energization phase switching period Pc is indicated in FIG. 9.

Figure 10:
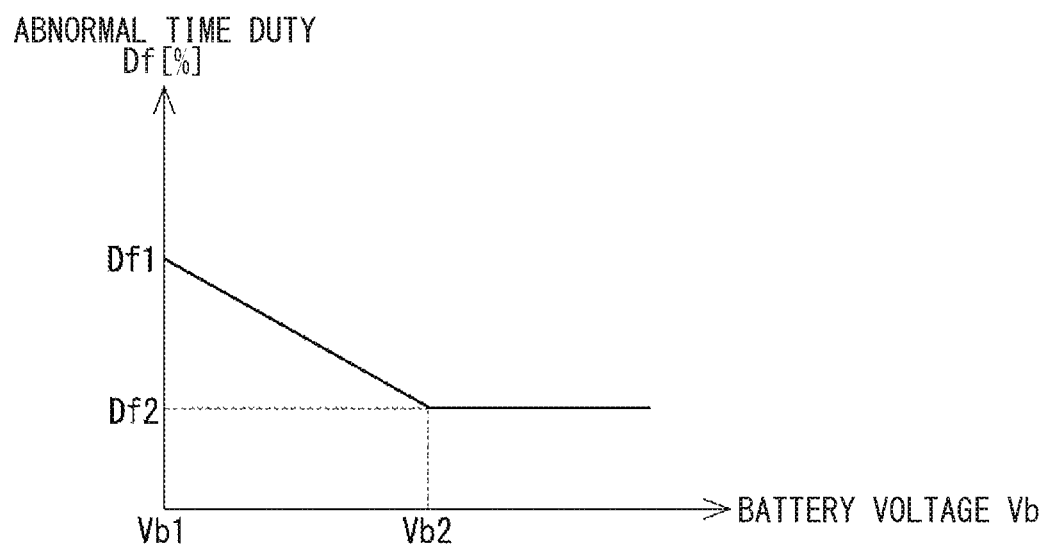
FIG. 10 is an explanatory view illustrating a relationship between a battery voltage and an abnormal-time duty according to the embodiment.

As illustrated in FIG. 9, a switching element to be turned on is switched every energization phase switching period Pc in the open drive control. In the present embodiment, an abnormal-time duty Df is less than 100% in the open drive control. As illustrated in FIG. 10, the abnormal-time duty Df is set according to the battery voltage Vb. Specifically, the duty when the battery voltage Vb is a normal lower limit value Vb1 is set to Df1 less than 100%. When the battery voltage Vb is less than a predetermined voltage Vb2, as the battery voltage Vb increases, the abnormal-time duty Df decreases. When the battery voltage Vb is larger than or equal to the predetermined voltage Vb2, the abnormal-time duty Df is set to a predetermined value Df2 (for example, 30%).

As illustrated in FIG. 9, at the time of UV-phase energization in which the switching elements 411 and 415 are turned on and a current flows from the U1 coil 111 to the V1 coil 112, the switching elements 411 and 415 are on-off controlled so that the rate of an on-period is the abnormal-time duty Df. As the duty is the abnormal-time duty Df, which is less than 100%, the energization amount can be reduced as compared to a case where switching elements 411 and 415 are kept turned on with a duty of 100%. Also in a case where the energization phase is different from the UV phase, switching elements are on-off controlled so that the rate of the on-time of the corresponding switching element is the abnormal-time duty Df. As a result, the energization amount can be reduced as compared to a case where the switching element is kept turned on. It is thus possible to reduce vibration of the motor 10 and to prevent out-of-step.

The duty is gradually changed when the energization duration Pk starts and ends. Specifically, when the energization duration Pk starts, the duty is gradually increased to the abnormal-time duty Df that is set according to the battery voltage Vb. When the energization duration Pk ends, the duty is gradually reduced to 0.

Figure 11:
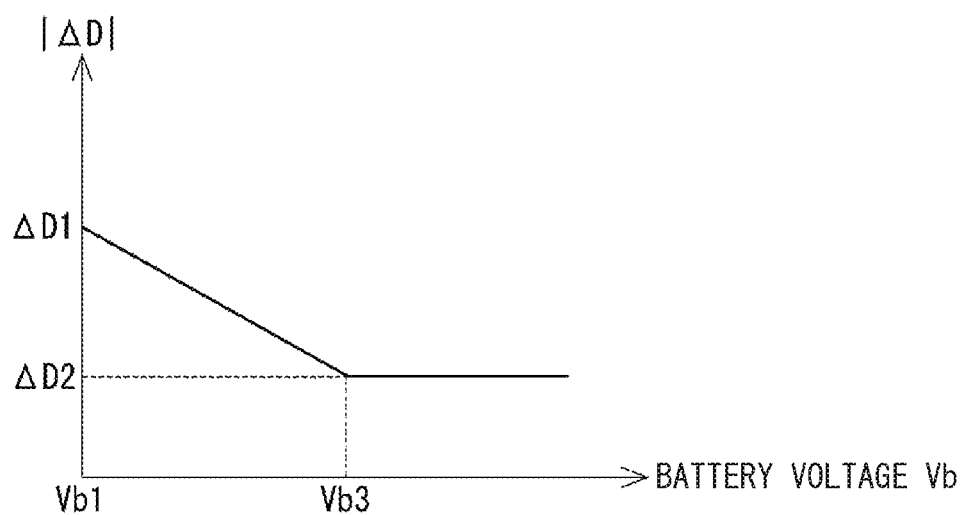
FIG. 11 is an explanatory view illustrating a relationship between the battery voltage and a duty gradient according to the embodiment.

As illustrated in FIG. 11, the duty variation per unit time when a duty is gradually changed at the time of the start and end of the energization duration Pk is defined as a duty gradient ΔD. The duty gradient ΔD is set according to the battery voltage Vb. Specifically, when the battery voltage Vb is the normal lower limit value Vb1, the absolute value of the duty gradient ΔD is a maximum value ΔD1. When the battery voltage Vb is less than a predetermined voltage Vb3, as the battery voltage Vb increases, the absolute value of the duty gradient ΔD decreases. When the battery voltage Vb is larger than or equal to the predetermined voltage Vb3, the absolute value of the duty gradient ΔD is set to a predetermined value ΔD2. As the duty is gradually changed at the time of the start and end of the energization duration Pk, a sudden change in current due to switching of an energization phase is reduced. It is thus possible to reduce vibration of the motor 10 and to prevent out-of-step.

The predetermined voltage Vb2 may be equal to the predetermined voltage Vb3 or be different from the predetermined voltage Vb3. Different maps may be used for the start and the end of the energization duration Pk, so that absolute values of the duty gradient ΔD may be different from each other. In FIGS. 10 and 11, an example is described in which the abnormal-time duty Df and the duty gradient ΔD linearly decrease according to an increase in the battery voltage Vb. However, the abnormal-time duty Df and the duty gradient ΔD may decrease non-linearly or stepwise.

Figure 12:
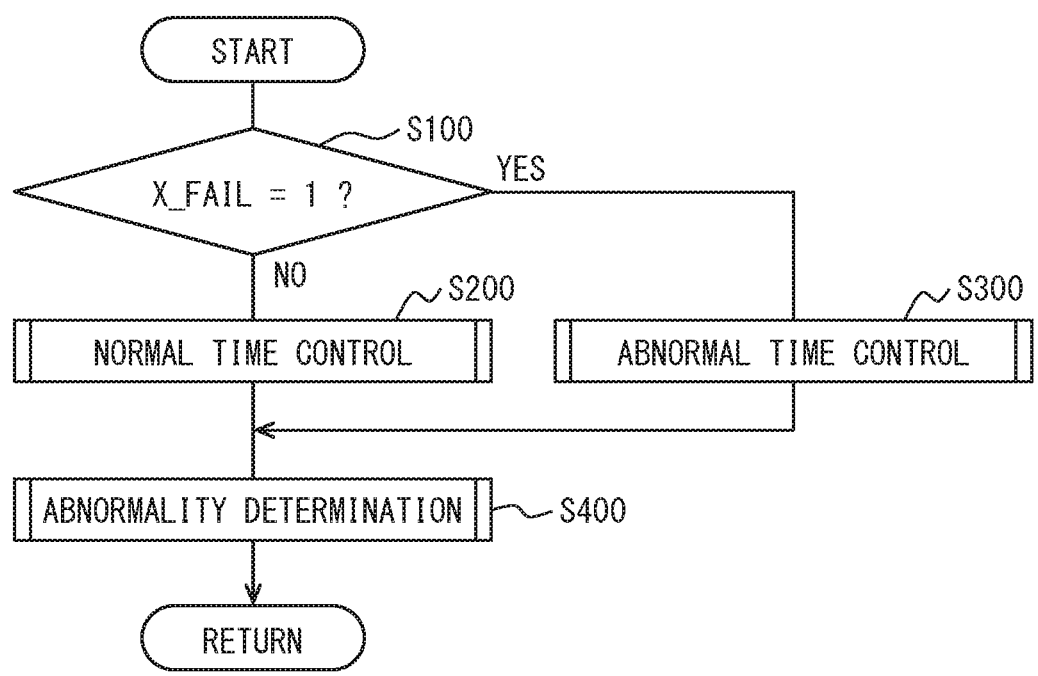
FIG. 12 is a flowchart for explaining shift-by-wire control processing according to the embodiment.

Shift-by-wire control processing according to the embodiment will be described with reference to a flowchart of FIG. 12. This processing is performed by the ECU 50 with a predetermined period while a start switch such as an ignition switch is turned on. Hereinafter, "step" in step S100 is abbreviated to "S". "Steps" in other steps are also abbreviated.

Whether an encoder abnormality flag is set is determined first at S100. In FIG. 12, the encoder abnormality flag is indicated as "X_FAIL". A state where the encoder abnormality flag is set is defined as "1" and a state where the encoder abnormality flag is not set is defined as "0". When it is determined that the encoder abnormality flag is not set (NO at S100), the process proceeds to S200 and the ECU 50 executes normal-time control. When it is determined that the encoder abnormality flag is set (YES at S100), the process proceeds to S300 and the ECU 50 executes abnormal-time control. At S400 subsequent to S200 or S300, the ECU 50 performs an abnormality determination process.

Figure 13:
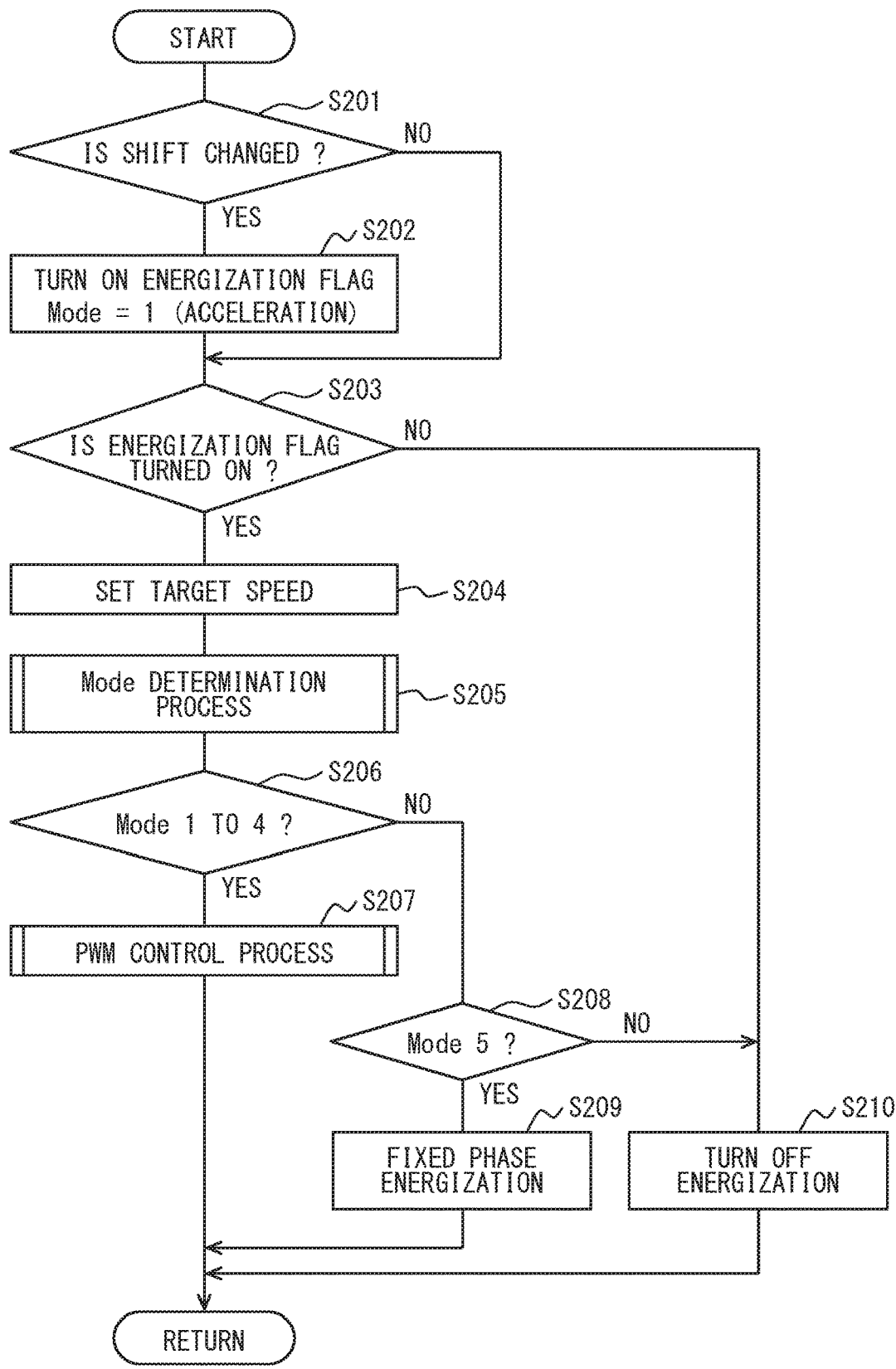
FIG. 13 is a flowchart for explaining a normal-time control process according to the embodiment.

The normal-time control process at S200 will be described with reference to a flowchart of FIG. 13. Before the normal-time control process is described, control modes of the motor 10 will be described. Mode 1 is "acceleration control", and the rotation of the motor 10 is accelerated. Mode 2 is "steady-state control", and the rotational speed of the motor 10 is kept to be substantially constant. Mode 3 is "deceleration control", and the rotation of the motor 10 is decelerated. Mode 4 is "sudden braking control", and a sudden brake is applied to the rotation of the motor 10. Mode 5 is "fixed-phase energization control", and the motor 10 is stopped. Mode 0 is "energization off control", and energization of the motor 10 is stopped.

The ECU 50 determines at S201 whether a driver-requested shift range is changed. When it is determined that the driver request shift range is not changed (NO at S201), the process proceeds to S203. When it is determined that the driver-requested shift range is changed (YES at S201), the process proceeds to S202.

The ECU 50 turns on a motor-10 energization flag at S202. The ECU 50 also sets the control state to mode 1, which is the acceleration control. The ECU 50 determines at S203 whether the energization flag is turned on. When it is determined that the energization flag is turned off (NO at S203), the process proceeds to S210. When it is determined that the energization flag is turned on (YES at S203), the process proceeds to S204. The target speed setting section 62 sets the target motor speed Msp* at S204. The normal-time controller 51 performs a mode determination process at S205.

Figure 14:
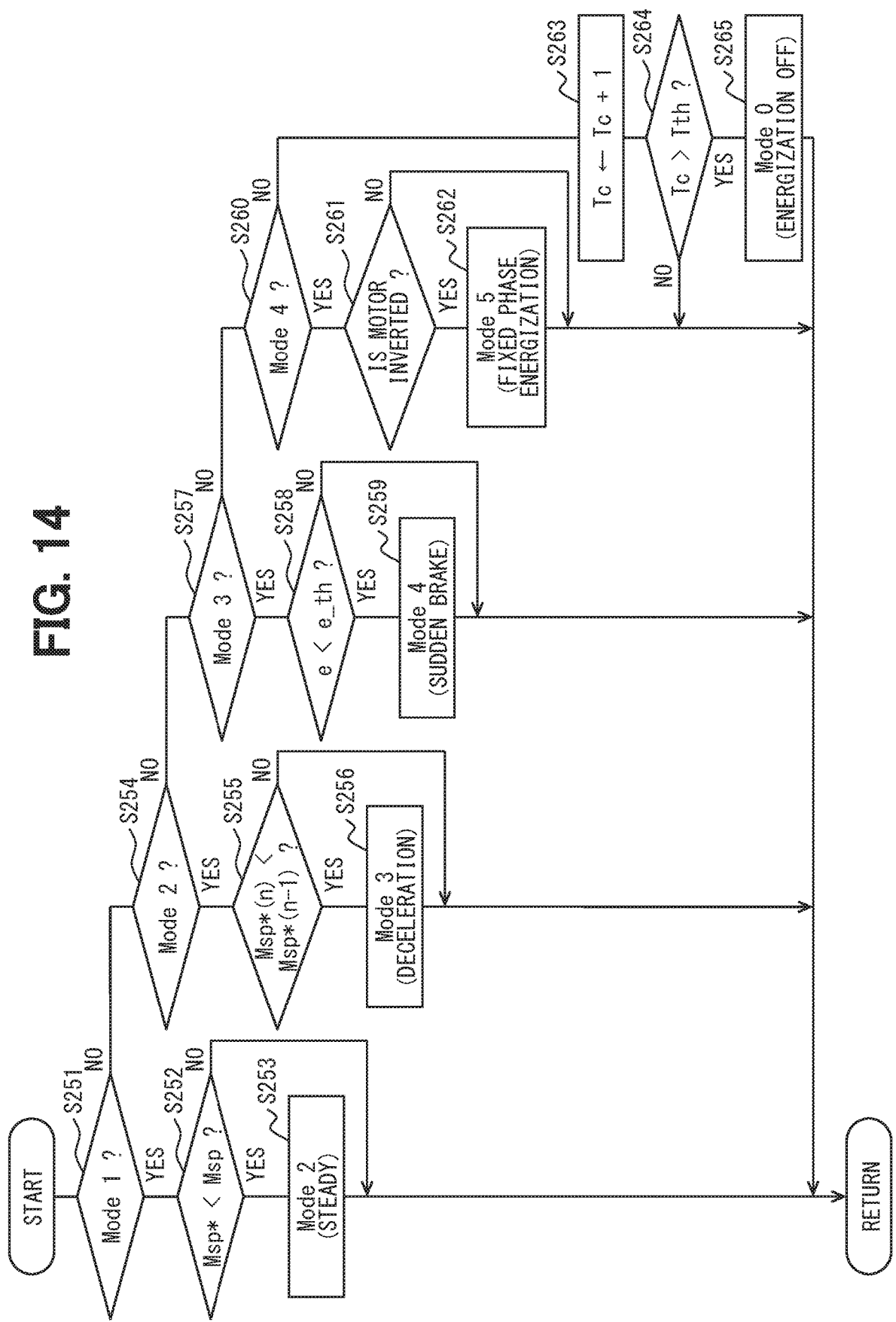
FIG. 14 is a flowchart for explaining a mode determination process according to the embodiment.
Figure 15:
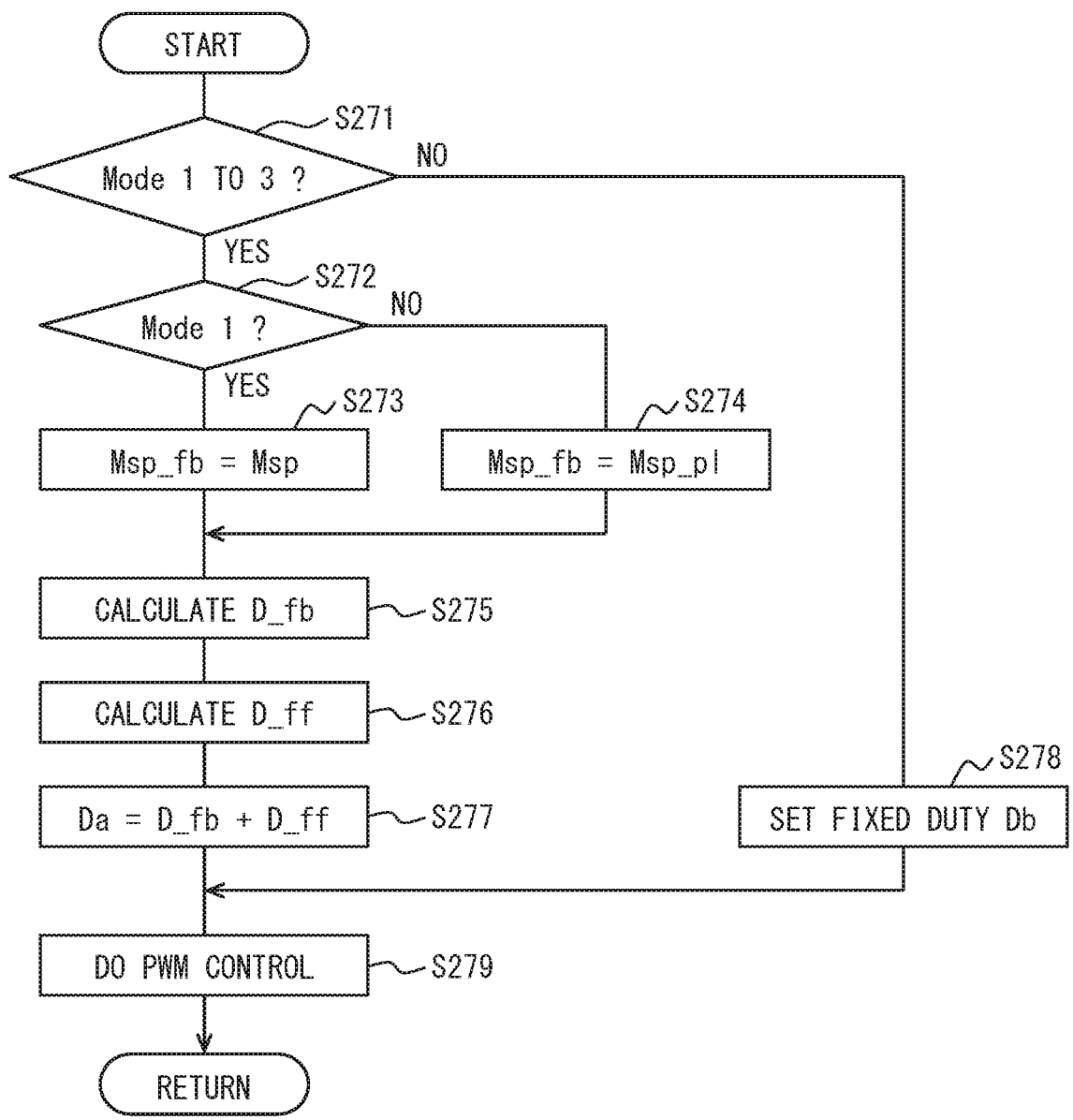
FIG. 15 is a flowchart for explaining a PWM control process according to the embodiment.

The mode determination process will be described with reference to FIG. 14. The normal-time controller 51 determines at S251 whether the control mode is mode 1. When it is determined that the control mode is not mode 1 (NO at S251), the process proceeds to S254. When it is determined that the control mode is mode 1 (YES at S251), the process proceeds to S252.

The normal-time controller 51 determines at S252 whether the target motor speed Msp* is lower than the current motor speed Msp. When it is determined that the target motor speed Msp* is higher than or equal to the current motor speed Msp (NO at S252), mode 1 continues. When it is determined that the target motor speed Msp* is lower than the current motor speed Msp (YES at S252), the process proceeds to S253. The normal-time controller 51 sets the control mode to mode 2, which is the steady-state control, at S253.

At S254 to which the process proceeds when it is determined that the control mode is not mode 1 (NO at S251), the normal-time controller 51 determines whether the control mode is mode 2. When it is determined that the control mode is not mode 2 (NO at S254), the process proceeds to S257. When it is determined that the control mode is mode 2 (YES at S254), the process proceeds to S255.

The normal-time controller 51 determines at S255 whether a current value Msp*(n) of the target motor speed is less than a previous value Msp*(n−1). When it is determined that Msp*(n) of the target motor speed is larger than or equal to the previous value Msp*(n−1) (NO at S255), mode 2 continues. When it is determined that Msp*(n) of the target motor speed is less than the previous value Msp*(n−1) (YES at S255), the process proceeds to S256. The normal-time controller 51 sets the control mode to mode 3, which is the deceleration control, at S256.

At S257 to which the process proceeds when it is determined that the control mode is not modes 1 and 2 (NO at S254), the normal-time controller 51 determines whether the control mode is mode 3. When it is determined that the control mode is not mode 3 (NO at S257), the process proceeds to S260. When it is determined that the control mode is mode 3 (YES at S257), the process proceeds to S258.

The normal-time controller 51 determines at S258 whether the angular deviation e is less than the angle determination threshold e_th. When it is determined that the angular deviation e is larger than or equal to the angle determination threshold e_th (NO at S258), mode 3 continues. When it is determined that the angular deviation e is less than the angle determination threshold e_th (YES at S258), the process proceeds to S259. The normal-time controller 51 sets the control mode to mode 4, which is the sudden brake control, at S259.

At S260 to which the process proceeds when it is determined that the control mode is not modes 1 to 3 (NO at S257), the normal-time controller 51 determines whether the control mode is mode 4. When it is determined that the control mode is not mode 4 (NO at S260), the process proceeds to S263. When it is determined that the control mode is mode 4 (YES at S260), the process proceeds to S261.

The inversion determination section 76 determines at S261 whether the motor 10 is inverted. When the motor 10 is rotated in a direction opposite to a rotation direction determined based on a range before or after switching a shift range, it is determined that the motor 10 is inverted. When it is determined that the motor 10 is not inverted (NO at S261), mode 4 continues. When it is determined that the motor 10 is inverted (YES at S261), the process proceeds to S262. The normal-time controller 51 sets the control mode to mode 5, which is the fixed-phase energization control, at S262.

At S263 to which the process proceeds when it is determined that the control mode is not modes 1 to 4 (NO at S260), the control mode is mode 5 and the normal-time controller 51 increments a timer value Tc that is a count value of a timer for measuring a duration of the fixed-phase energization control. The ECU 50 determines at S264 whether the timer value Tc is larger than a duration determination threshold Tth. The duration determination threshold Tth is set according to a fixed-phase energization duration Ta (for example, 100 ms) during which the fixed-phase energization control continues. When it is determined that the timer value Tc is less than or equal to the duration determination threshold Tth (NO at S264), mode 5 continues. When it is determined that the timer value Tc is larger than the duration determination threshold Tth (YES at S264), the process proceeds to S265. The normal-time controller 51 sets the control mode to mode 0, which is the energization off control, at S265.

Returning to FIG. 13, at S206 to which the process proceeds subsequent to the mode determination process, the normal-time controller 51 determines whether the control mode is any of modes 1 to 4. When the control mode is any of modes 1 to 4, the PWM control is executed on the motor 10. When it is determined that the control mode is other than modes 1 to 4 (NO at S206), the process proceeds to S208. When it is determined that the control mode is any of modes 1 to 4 (YES at S206), the process proceeds to S207.

The normal-time controller 51 controls drive of the motor 10 with the PWM control at S207. The PWM control will be described with reference to FIG. 15. The normal-time controller 51 determines at S271 whether the control mode is any of modes 1 to 3. When the control mode is any of modes 1 to 3, feedback control is executed on the motor 10. When it is determined that the control mode is not any of modes 1 to 3, that is, is mode 4 (NO at S271), the process proceeds to S278. When it is determined that the control mode is any of modes 1 to 3 (YES at S271), the process proceeds to S272.

The normal-time controller 51 determines at S272 whether the control mode is mode 1. When it is determined that the control mode is mode 1 (YES at S272), the process proceeds to S273. When it is determined that the control mode is not mode 1, that is, is mode 2 or 3 (NO at S272), the process proceeds to S274.

The feedback value setting section 63 outputs the motor speed Msp to the speed deviation calculator 64 as the speed feedback value Msp_fb at S273. The feedback value setting section 63 outputs a phase advancing compensation value Msp_pl of the motor speed Msp to the speed deviation calculator 64 as the speed feedback value Msp_fb at S274.

The controller 65 calculates the feedback duty D_fb at S275. The feed forward term calculator 66 calculates the feedforward duty D_ff according to the control mode at S276. The adder 67 adds the feedback duty D_fb to the feed forward duty D_ff, thus calculating the corrected feedback duty Da at S277.

At S278 to which the process proceeds when it is determined that the control mode is mode 4 (NO at S271), the sudden braking duty calculator 70 sets the fixed duty Db according to the rush speed Msp_i. When the fixed duty Db is set, the set value is kept. The PWM signal generator 73 generates the command signal Spwm based on the corrected feedback duty Da calculated or the fixed duty Db at S279. The ECU 50 controls drive of the motor 10 based on the command signal Spwm generated.

Returning to FIG. 13, at S208 to which the process proceeds when it is determined that the control mode is other than modes 1 to 4 (NO at S206), the normal-time controller 51 determines whether the control mode is mode 5. When it is determined that the control mode is mode 5 (YES at S208), the process proceeds to S209. When it is determined that the control mode is not mode 5 (NO at S208), that is, the control mode is mode 0, the process proceeds to S210. The normal-time controller 51 executes the fixed-phase energization control at S209. Specifically, the fixed-phase energization controller 75 generates the command signal Sfix for energizing a fixed phase according to the actual count value Cen. The ECU 50 controls drive of the motor 10 based on the command signal Sfix generated. The ECU 50 turns off energization of the motor 10 at S210.

Figure 16:
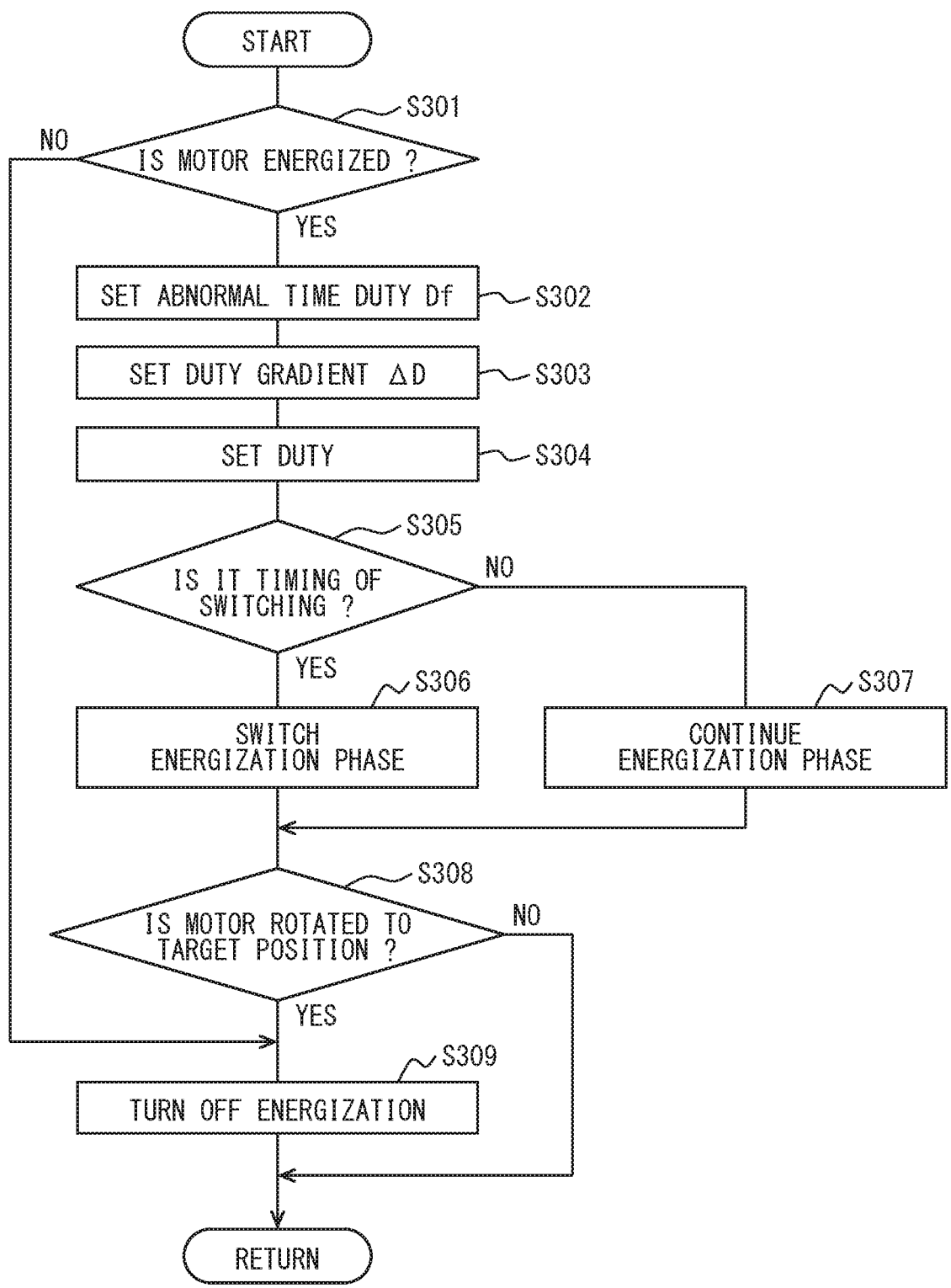
FIG. 16 is a flowchart for explaining an abnormal-time control process according to the embodiment.

The abnormal-time control process at S300 will be described with reference to a flowchart of FIG. 16. In the abnormal-time control process, the time from the start of the abnormal-time control process is measured. The abnormal-time controller 82 determines at S301 whether the motor 10 is energized. Whether the motor 10 is energized is determined based on an energization flag, for example. When it is determined that the motor 10 is not energized (NO at S301), the process proceeds to S309. When it is determined that the motor 10 is energized (YES at S301), the process proceeds to S302.

The abnormal-time controller 82 sets the abnormal-time duty Df based on the battery voltage Vb at S302. The abnormal-time controller 82 sets the duty gradient ΔD based on the battery voltage Vb at S303. The abnormal-time controller 82 sets duties of the respective phases according to the time elapsed from the start of the abnormal-time control process at S304.

The abnormal-time controller 82 determines whether it is a timing of switching an energization phase based on the time elapsed from the start of the abnormal-time control process at S305. When it is determined that it is the timing of switching an energization phase (YES at S305), the process proceeds to S306. When it is determined that it is not the timing of switching an energization phase (NO at S305), the process proceeds to S307.

The abnormal-time controller 82 switches an energization phase at S306. Specifically, the duty of a switching element switched from an off-state to and on-state is gradually changed to the abnormal-time duty Df with the duty gradient ΔD. In addition, the duty of a switching element switched from an on-state to an off-state is gradually changed to 0 with a gradient −ΔD. The abnormal-time controller 82 does not switch the energization phase and continues the current energization phase at S307. Specifically, the switching element to be controlled is not changed and an on-off operation continues with the abnormal-time duty Df set at S302.

The abnormal-time controller 82 determines at S308 whether the motor 10 is rotated to a target position. Since the count value of the encoder 13 cannot be used in the abnormal-time control process, the determination is made based on a count value for the number of switching times of an energization phase, or the time elapsed from the start of the abnormal-time control process or the like. When it is determined that the motor 10 is not rotated to the target position (NO at S308), the process at S309 is not performed. When it is determined that the motor 10 is rotated to the target position (YES at S308), the process proceeds to S309. The ECU 50 turns off energization of the motor 10 at S309. When energization of the motor 10 is already turned off, an energization off state continues.

Figure 17:
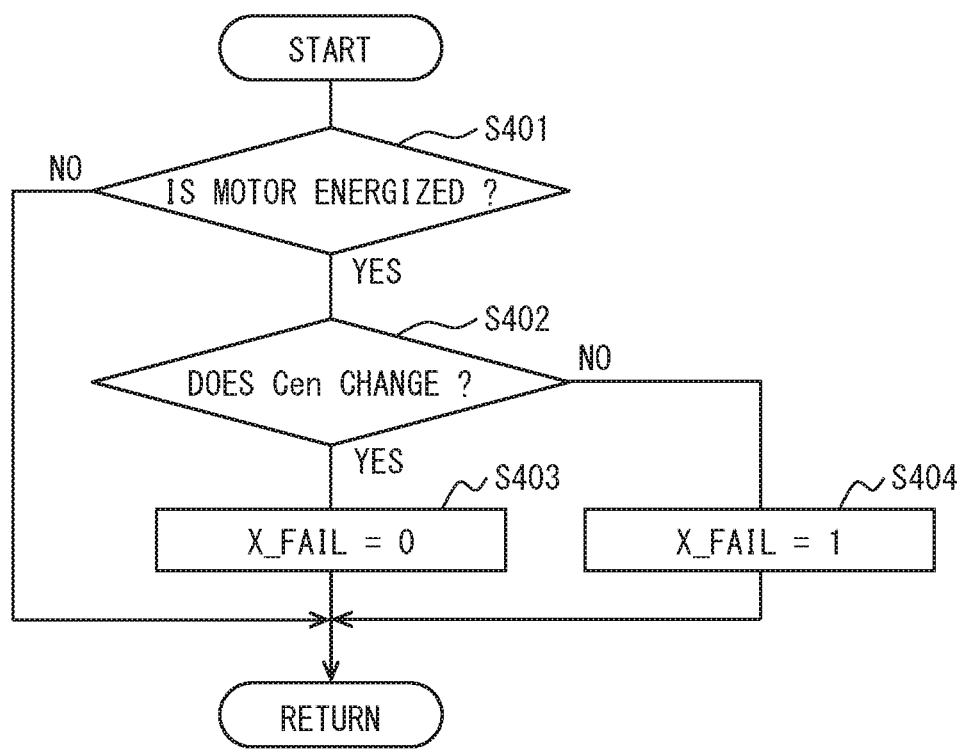
FIG. 17 is a flowchart for explaining an abnormality determination process according to the embodiment.

The abnormality determination process at S400 will be described with reference to a flowchart of FIG. 17. The abnormality determination section 81 determines at S401 whether the motor 10 is energized. Similarly to the determination at S301, whether the motor 10 is energized is determined based on an energization flag, for example. When it is determined that the motor 10 is not energized (NO at S401), processes subsequent to S402 are not performed. When it is determined that the motor 10 is energized (YES at S401), the process proceeds to S402.

The abnormality determination section 81 determines at S402 whether the actual count value Cen of the encoder 13 changes during the abnormality duration Te. When it is determined that the actual count value Cen changes during the abnormality duration Te (YES at S402), the process proceeds to S403. When it is determined that the actual count value Cen does not change during the abnormality duration Te (NO at S402), the process proceeds to S404. The abnormality determination section 81 resets the encoder abnormality flag at S403. The abnormality determination section 81 sets the encoder abnormality flag at S404.

When the actual count value Cen does not change over the abnormality duration Te during energization of a motor, it is determined that an abnormality occurs in the encoder 13 in the present embodiment. When an abnormality occurs in the encoder 13, open drive control that does not use the actual count value Cen that is the count value of the encoder 13 is executed as the abnormal-time control. According to the open drive control, by periodically switching an energization phase, the motor 10 can be driven without using the actual count value Cen. Consequently, even in an abnormality of the encoder 13, the shift range is appropriately switchable and limp home performance is enhanced.

Since the abnormal-time duty Df in the open drive control is less than 100% in the present embodiment, the energization amount of the motor 10 is less than that in a case where the duty is 100%. It is thus possible to reduce vibration of the motor 10 and appropriately rotate the motor 10 to a target position according to a requested shift range without out-of step. As the duty at the time of switching of an energization phase is gradually changed, a sudden change in current due to switching of an energization phase is reduced. It is thus possible to reduce vibration of the motor 10 at the time of switching an energization phase and appropriately rotate the motor 10 to a target position according to a requested shift range without out-of step.

As described above, the shift range control apparatus 40 according to the present embodiment is a shift range control apparatus that controls on-off operations of the switching elements 411 to 416 of the motor driver 41 and the switching elements 421 to 426 of the motor driver 42 to drive the motor 10, thus switching a shift range. The shift range control apparatus 40 includes the abnormality determination section 81, the normal-time controller 51, and the abnormal-time controller 82. The abnormality determination section 81 detects an abnormality of the encoder 13 that detects the rotation angle of the motor 10. When the encoder 13 is normal, the normal-time controller 51 controls drive of the motor 10 using a detection value of the encoder 13. When the encoder 13 is abnormal, the abnormal-time controller 82 executes open drive control that is abnormal-time control in which the energization phase is switched every energization phase switching period Pc without using the detection value of the encoder 13. The abnormal-time controller 82 sets a current reduction period during which the duty is less than 100% in at least a part of the energization duration Pk during which energization continues in one phase in the same direction.

When the U-phase switching element 411 is turned on and the U-phase switching element 414 is turned off, energization continues in the U1 coil 111 in a direction of flowing into the connecting portion 115. When the duty is 100%, the on-state of the switching element 411 continues over the energization duration Pk. In the present embodiment, the duty is reduced to be less than 100% at least in a part of the energization duration Pk, and the period during which the switching element 411 is turned off is set. The amount of current is thus less than that in the case where the duty is 100%. As a result, when the encoder 13 is abnormal, vibration of the motor 10 can be reduced and at the same time, the motor 10 can be appropriately rotated to a target position according to a requested shift range without using a detection value of the encoder 13.

The abnormal-time controller 82 sets the duty to the abnormal-time duty Df, which is less than 100%, over the entire energization duration Pk. As a result, since the amount of current can be reduced over the energization duration Pk, vibration of the motor 10 can be reduced appropriately. The abnormal-time duty Df is variable according to the battery voltage Vb. It is thus possible to more appropriately reduce vibration of the motor 10 according to the battery voltage Vb.

At the time of the start of the energization duration Pk, the abnormal-time controller 82 gradually changes the duty of the switching elements 411 to 416 and 421 to 426 that are to be switched from an off-state to an on-state from 0 to a predetermined duty. The duty is gradually changed to the abnormal-time duty Df in the present embodiment. The abnormal-time controller 82 gradually changes the duty of the switching elements 411 to 416 and 421 to 426 that are to be switched from an on-state to an off-state to 0 at the end of the energization duration Pk. As a result, since a sudden change in current can be reduced at the time of switching an energization phase, vibration of the motor 10 can be reduced appropriately. "On-state" is a state where on and off are repeated with a predetermined duty. When the duty is 100%, the switching elements 411 to 416 and 421 to 426 are kept turned on.

The duty gradient ΔD when the duty is gradually changed at the time of the start or end of an energization duration is variable according to the battery voltage Vb. It is thus possible to more appropriately reduce vibration of the motor 10 according to the battery voltage Vb.

Other Embodiments

According to the above embodiment, in abnormal-time control, the duty over the entire energization duration is an abnormal-time duty that is less than 100%, and then is gradually changed at the time of the start or end of the energization duration. According to other embodiments, in the abnormal-time control, when the duty is an abnormal-time duty that is less than 100% over the entire energization duration, the duty at the time of the start of the energization duration does not have to be gradually changed, and the duty may be changed to the abnormal-time duty simultaneously with the start of the energization duration. When the duty is the abnormal-time duty that is less than 100% over the entire energization duration, the duty at the time of the end of the energization duration does not have to be gradually changed, and the duty may be changed to 0 simultaneously with the end of the energization duration.

According to other embodiments, in the abnormal-time control, when the duty is gradually changed at the time of the start or end of the energization duration, the duty during a period other than the time when the duty is gradually changed may be 100% and the corresponding switching element may be kept turned on. In this case, the period during which the duty is gradually changed is a current reduction period. Consequently, in the abnormal-time control, the current reduction period during which the duty is less than 100% is set in at least a part of the energization duration. The energization amount is thus less than that in a case where energization is performed with a duty of 100% over the entire energization duration. It is thus possible to reduce vibration of a motor and rotate the motor 10 to a target position without out-of step.

The abnormal-time duty is variable according to an input voltage in the above embodiment. The abnormal-duty does not have to be set according to an input voltage, and may be a predetermined value in other embodiments. The duty gradient at the time of the start or end of an energization duration is variable according to an input voltage in the above embodiment. The duty gradient at the time of the start or end of an energization duration does not have to be set according to an input voltage, and may be a predetermined value in other embodiments. The input voltage is a battery voltage in the above embodiment. Values other than the battery voltage may be used in other embodiments, as long as the values are related to a voltage input to a motor driver.

In the above embodiment, the energization phase switching period is constant. In other embodiments, the energization phase switching period from the start of abnormal-time control until the energization phase is switched for a predetermined number of times may be longer than that after the energization phase is switched for the predetermined number of times. As the energization phase switching period immediately after the abnormal-time control starts, where a motor is likely to vibrate, is extended, vibration of the motor at the start of the abnormal-time control can be appropriately reduced.

The motor is a permanent magnet three-phase brushless motor in the above embodiment. The motor is not limited to a three-phase brushless motor and any motor may be used in other embodiments. Two winding sets are formed in a motor in the above embodiment. One winding set or three or more winding sets may be used in other embodiments.

In the above embodiment, during normal-time control, the detection value of a rotation angle sensor is used to set a target speed based on an angular deviation, and drive of a motor is controlled by speed feedback control. By switching from the speed feedback control to sudden braking control and then to fixed-phase energization control, a motor is stopped at a target position. In other embodiments, the normal-time control may be any control that uses the detection value of the rotation angle sensor.

Drive of a motor is controlled by so-called 120° energization in the above embodiment. Control other than 120° energization may be executed in other embodiments. For example, so-called 180° energization may be performed. Alternatively, the normal-time control may be PWM control using a triangular wave comparison method or an instantaneous vector selection method.

In the above embodiment, when the speed state is in steady-state control or deceleration control, a phase advancing value subjected to a phase advancing filter process is fed back. In other embodiments, when the speed state is in acceleration control, a value subjected to the phase advancing filter process may be fed back. The phase advancing filter process in at least one of a steady state and a deceleration state may be omitted. The method of determining the speed state is not limited to the method described in the above embodiment, and may be any method including a determination method using a differential value of a motor speed.

In the above embodiment, switching from feedback control to sudden braking control with a fixed duty is determined by using one angle determination threshold. In other embodiments, the angle determination threshold may be variable according to a motor speed. For example, as the motor speed increases, the angle determination threshold may increase accordingly. In the above embodiment, the fixed duty in sudden braking control is set according to a rush speed. In other embodiments, the fixed duty may be a predetermined value (for example, the maximum duty) independent of the rush speed.

In fixed-phase energization control, the duty until the duty fixing time elapses is the maximum duty in the above embodiment. The duty until the duty fixing time elapses in the fixed-phase energization control does not have to be the maximum duty in other embodiments. The duty changing process in the fixed-phase energization control may be omitted and the duty may be constant during fixed-phase energization in other embodiments.

The encoder is used as the rotation angle sensor that detects the rotation angle of a motor in the above embodiment. The rotation angle sensor is not limited to the encoder and any sensor such as a resolver may be used in other embodiments. Values other than an encoder count value may be fed back instead of the encoder count value, as long as the values can be converted into a motor rotation angle. The same holds true for selection of a fixed phase in fixed-phase energization control.

The detent plate includes four recesses in the above embodiment. The detent plate may include any number of recesses in other embodiments. For example, the detent plate may include two recesses for switching between a P range and a notP range. In addition, the shift range switching mechanism and the parking lock mechanism may be different from those of the above embodiment.

A decelerator is disposed between a motor shaft and an output shaft in the above embodiment. While the decelerator is not described in detail in the above embodiment, the decelerator may be any decelerator that uses a cycloid gear, a planetary gear, or a spur gear that transmits torque from a decelerator mechanism substantially coaxial with the motor shaft to a drive shaft, or be any combination of such gears. In other embodiments, the decelerator disposed between the motor shaft and the output shaft may be omitted, or mechanisms other than the decelerator may be disposed between the motor shaft and the output shaft. As described above, the present disclosure is not limited to the above embodiment, and may be implemented in various modes without departing from the scope of the disclosure.

The present disclosure has been made in accordance with the embodiments. However, the present disclosure is not limited to the embodiments and structures. That is, the present disclosure also encompasses various modifications and variations within the scope of equivalents. Furthermore, other combinations and other forms including various combinations and various forms of only one element, or more, or less, are also within the scope and spirit of the present disclosure.

What is claimed is:

1. A shift range control apparatus that controls on-off operations of a plurality of switching elements in a driver circuit, drives a motor, and switches a shift range, the shift range control apparatus comprising:
    an abnormality determination section that determines an abnormality of a rotation angle sensor detecting a rotation angle of the motor;
    a normal-time controller that controls a drive of the motor using a detection value of the rotation angle sensor in response to a determination that the rotation angle sensor is normal; and
    an abnormal-time controller that executes abnormal-time control which switches an energization phase without using the detection value of the rotation angle sensor in response to a determination that the rotation angle sensor is abnormal, by switching the switching elements to be turned on every energization phase switching period, and drives the motor stepwise, the energization phase switching period being constant,
    wherein:
    the abnormal-time controller sets a current reduction period during which a duty is less than 100% in at least a part of an energization duration during which energization continues in one phase in a same direction.

2. The shift range control apparatus according to claim 1, wherein:
    the abnormal-time controller sets a duty to an abnormal-time duty having less than 100% over an entire period of the energization duration.

3. The shift range control apparatus according to claim 2, wherein:
    the abnormal-time duty is variable in accordance with an input voltage to the driver circuit.

4. The shift range control apparatus according to claim 1, wherein:
    at a time of start of the energization duration, the abnormal-time controller gradually changes the duty of the switching elements that is switched from an off-state to an on-state from 0 to a predetermined duty.

5. The shift range control apparatus according to claim 4, wherein:
    a duty gradient that is a duty variation per unit time when a duty is gradually changed at a time of start or end of the energization duration is variable in accordance with an input voltage to the driver circuit.

6. The shift range control apparatus according to claim 1, wherein:
    at a time of end of the energization duration, the abnormal-time controller gradually changes the duty of the switching elements that is switched from an on-state to an off-state to 0.

7. A shift range control apparatus that controls on-off operations of a plurality of switching elements in a driver circuit, drives a motor, and switches a shift range, the shift range control apparatus comprising:
- an ECU that is configured to
  - determine an abnormality of a rotation angle sensor detecting a rotation angle of the motor;
  - control a drive of the motor using a detection value of the rotation angle sensor in response to a determination that the rotation angle sensor is normal; and
  - execute, in response to a determination that the rotation angle sensor is abnormal, abnormal-time control which switches an energization phase without using the detection value of the rotation angle sensor by switching the switching elements to be turned on every energization phase switching period, and drives the motor stepwise, the energization phase switching period being constant,
- wherein:
- the ECU sets a current reduction period during which a duty is less than 100% in at least a part of an energization duration during which energization continues in one phase in a same direction.

\* \* \* \* \*